United States Patent [19]
Fellers et al.

[11] Patent Number: 5,779,838
[45] Date of Patent: Jul. 14, 1998

[54] METHOD FOR MAKING A FIBER-REINFORCED STRUCTURE INVOLVING A POLYMER-IMPREGNATED FIBER STRAND

[76] Inventors: John F. Fellers, 616 Galveston Rd.. Knoxville, Tenn. 37923; Albert E. Pope, 4704 Gwinfield Dr., Knoxville, Tenn. 37920

[21] Appl. No.: 630,167
[22] Filed: Apr. 10, 1996
[51] Int. Cl.⁶ .................................... B65H 81/00
[52] U.S. Cl. .................. 156/195; 156/169; 156/175; 156/425
[58] Field of Search .................. 156/195, 425, 156/169, 173, 175, 180, 433, 441, 429

[56] References Cited

U.S. PATENT DOCUMENTS

| | | |
|---|---|---|
| 3,993,726 | 11/1976 | Moyer. |
| 4,078,957 | 3/1978 | Bradt .................... 156/195 X |
| 4,487,647 | 12/1984 | Semeghini et al. . |
| 5,057,175 | 10/1991 | Ashton . |
| 5,205,898 | 4/1993 | Wilson et al. . |
| 5,236,972 | 8/1993 | Reinhart . |
| 5,316,834 | 5/1994 | Matsuda et al. . |
| 5,364,657 | 11/1994 | Throne . |
| 5,409,642 | 4/1995 | Allen et al. . |

*Primary Examiner*—Jeff H. Aftergut
*Attorney, Agent, or Firm*—Michael E. McKee

[57] ABSTRACT

A method for forming a structure of polymer-impregnated fiber and the structure formed thereby involves the rotation of a mandrel about an axis and the winding of a continuous polymer-impregnated fiber strand about the mandrel. The polymer-impregnated fiber strand is fed to the rotating mandrel so that the mandrel pulls the strand toward and winds the strand about the mandrel surface in an arrangement of windings. As the polymer-impregnated fiber strand is wound about the mandrel, the adjacent windings of the winding arrangement provide the structure with a close radial wrap, the fibers of the strand shift to an off-axis orientation, and the arrangement of windings is shifted along the length of the mandrel as the arrangement is formed to accommodate the feed of subsequent segments of the polymer-impregnated strand to the surface of the mandrel for winding thereabout. The polymer-impregnated strands of the winding arrangement are subsequently permitted to cure, or cool, to a hardened condition.

15 Claims, 3 Drawing Sheets

METHOD FOR MAKING A FIBER-REINFORCED STRUCTURE INVOLVING A POLYMER-IMPREGNATED FIBER STRAND

BACKGROUND OF THE INVENTION

This invention relates generally to the making of fiber-reinforced structures and relates, more specifically, to the making of such structures with a continuous strand of polymer-impregnated fiber.

It is known that a continuous strand of fiber can be impregnated with a polymer melt for use in a fiber-reinforced structure. One such method, known as pultrusion, involves a pulling of a continuous fiber through a impregnating medium, e.g. such as a plastic melt, and then through a forming die to shape the product. The formed product is subsequently cooled to a hardened condition and used in applications intended to take advantage of the relatively high tensile strength of the product.

It is an object of the present invention to provide a new and improved method for making a fiber-reinforced structure utilizing a continuous fiber strand which has been impregnated with a polymer melt and a structure formed by the method.

Another object of the present invention is to provide such a method which can be performed continuously so that structures of any desired length can be made.

Still another object of the present invention is to provide such a method wherein the desired structure is formed before the polymer of the polymer-impregnated fiber strand is permitted to completely cool, or cure, to a hardened condition.

A further object of the present invention is to provide such a method which is well-suited for making a structure having a rotational symmetry about a longitudinal axis, such as a tubular structure, wherein the structure has a relatively high hoop strength.

A still further object of the present invention is to provide such a method which is uncomplicated in nature and relatively easy to perform.

SUMMARY OF THE INVENTION

This invention resides in a method for forming a structure of polymer-impregnated fiber and a structure formed by the method.

The method of the invention includes the steps of providing a rotatable mandrel having a peripheral surface about which the desired structure is to be formed and a length which terminates at a free end and wherein the mandrel surface includes a preselected section along the mandrel length which is spaced from the free end, and rotating the mandrel about a rotational axis. A continuous fiber strand which has been impregnated with a heated polymer melt is provided, and the continuous strand of polymer-impregnated fiber is fed to the preselected section of the surface of the rotating mandrel while the polymer of the polymer-impregnated strand is in a melted condition so that the mandrel pulls the strand toward and winds the strand about the mandrel surface in an arrangement of windings. The arrangement of windings are advanced along the length of the mandrel toward and off of the free end as the polymer-impregnated fiber strand is fed to the preselected section of the mandrel surface, and the polymer of the polymer-impregnated strand is permitted to cool as the arrangement of windings is advanced toward and off of the free end so that upon advancement of the windings of the arrangement off of the free end, the polymer contained within the strands of the windings is at least partially-hardened.

The structure of the invention has a hollow core and a continuous strand of polymer-impregnated fiber which is wound about so as to encircle the hollow core of the structure in an arrangement of windings wherein the polymer of each winding of the arrangement is bonded to the polymer of its adjacent winding.

DETAILED DESCRIPTION OF AN ILLUSTRATIVE EMBODIMENT

Figure 1:
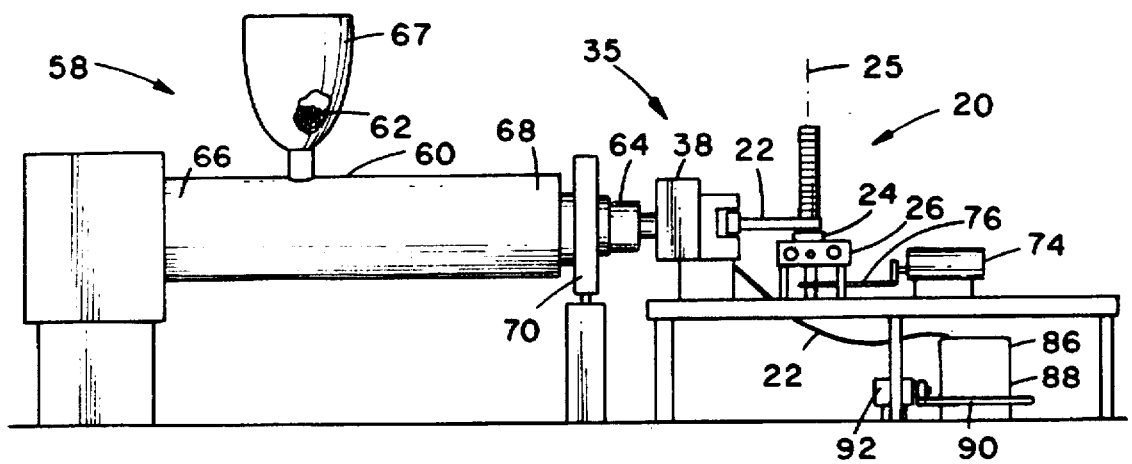
FIG. 1 is a schematic elevational view of a system with which the method of the invention can be carried out, shown partially cut-away.

Turning now to the drawings in greater detail, there is illustrated in FIG. 1 a system, generally indicated 20, with which an embodiment of the method of the invention can be carried out. The method embodiment described herein involves the impregnation of a continuous strand 22 of fiber with a polymer melt and the feeding of the polymer-impregnated strand to a rotating mandrel 24 where the polymer-impregnated strand is wound about the mandrel 24 in a close radial wrap. Tension is exerted (in an intermittent fashion) upon the strand 22 as it is fed to the mandrel 24, and the mandrel 24 is configured so that the tension applied to the strand 22 helps to shift, or advance, the accumulated windings of the strand 22 about the mandrel 24 axially along the surface thereof to increase the length of the accumulated windings.

Figure 6:
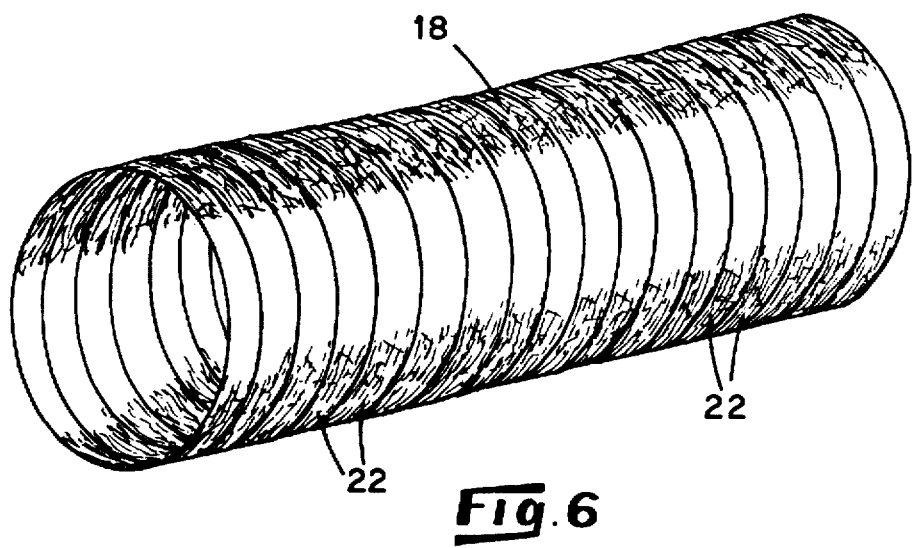
FIG. 6 is a perspective view of an embodiment of a product formed with the method of the invention.

The product formed by the method is a tubular structure 18 (best shown in FIG. 6) comprised entirely of a continuous strand of polymer-impregnated fiber whose strand is wound about the hollow interior of the product in a close radial wrap and wherein the adjacent windings of the product are in engagement with one another. During the winding of the polymer-impregnated strand about the mandrel 24 (FIG. 1), the polymer melt is in a softened condition so that after the polymer within the windings has cooled (i.e. cured) to a hardened condition, adjacent windings of the product 18 are bonded to one another by way of the polymer. It has been found that the product 18 has a relatively high hoop strength, good crush strength and long term durability.

Figure 2:
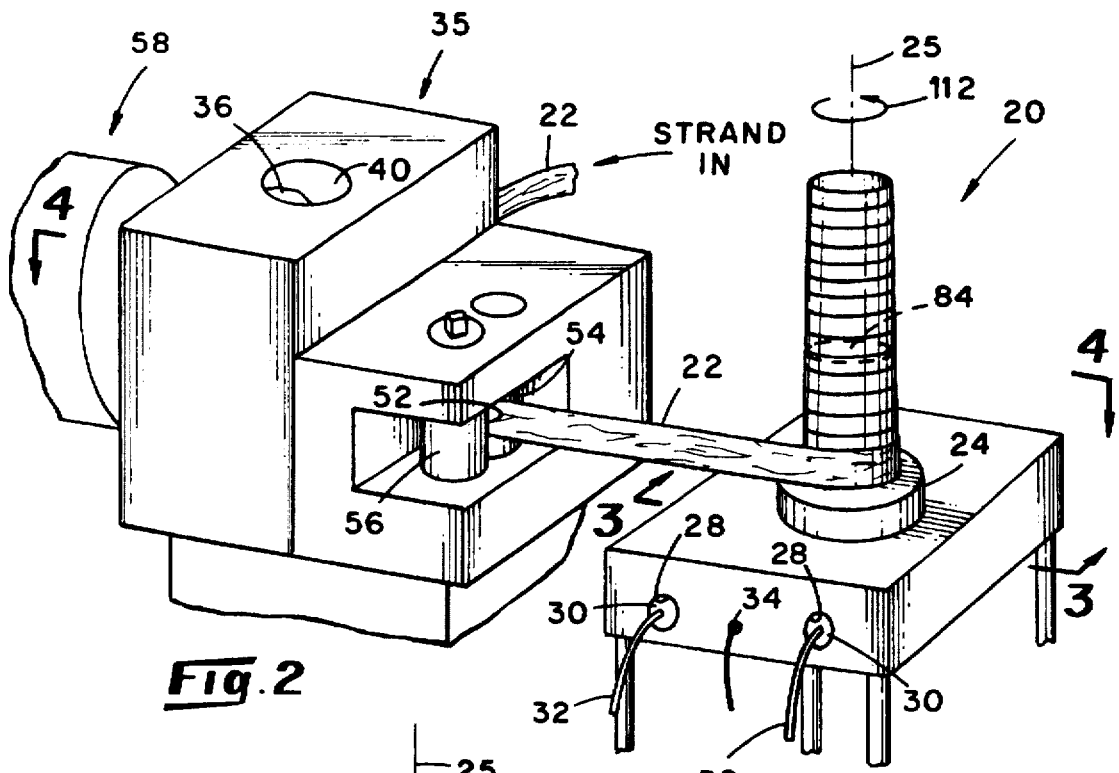
FIG. 2 is a perspective view of a fragment of the FIG. 1 system.

As best shown in FIG. 2, the system 20 includes a heating block 26 upon which the mandrel 24 is rotatably mounted for rotation about a substantially vertical axis 25, and this heating block 26 is used to heat the mandrel 24 and help control the temperature of the polymer contained within the windings accumulated about the mandrel 24. To this end, the block 26 is constructed of aluminum and includes two recesses 28 which open out of a side thereof within which are positioned electrical heating elements 30 having wires 32 which are connectable to an electric power source (not shown). Also positioned within the body of the block 26 and connected in controlling relationship with the heating elements 30 is a thermocouple 34 adapted to maintain the temperature of the block 26 at no less than a predetermined temperature. The mandrel 24, in turn, has a base which is closely positioned adjacent the upper surface of the block 26 so that much of the heat which is generated by the elements 30 is transferred to the mandrel 24. Thus, by controlling the temperature of the heating block 26, the temperature of the mandrel 24 can be controlled.

The system 20 also includes a wetting assembly 35 through which the strand 22 is routed before it reaches the mandrel 24 and into which a polymer melt 36 is introduced. More specifically and with reference to FIGS. 2 and 4, the wetting assembly 35 includes a body 38 having a central cavity 40 and openings 42 and 44 through which the strand 22 and the polymer melt 36, respectively, are introduced into the cavity 40. Rotatably mounted within the cavity 40 is a scrubber member 46 having a plurality of pins 48 arranged in parallel relationship about the periphery of the member 46. Also mounted within the body cavity 40 and in a stationary condition about the pins 48 is a second arrangement of parallel pins 50. As will be apparent herein, the polymer melt 36 is introduced into the cavity 40 by way of the body opening 44, and the fiber strand 22 is routed through the cavity 40 over the pins 48 of the scrubber member 46 and the stationary pins 50. Upon rotation of the scrubber member 46 about a substantially vertical axis by means of a motor (not shown) mounted beneath the body 38, the pins 48 and 50 cooperate with one another in a washboard-type action to blend the polymer melt 36 within the fibers of the strand 22 so the strand fibers are thoroughly wetted, or bathed, with the polymer melt 36 before the strand 22 exits the body cavity 40.

Also associated with the wetting assembly 35 is a slot-like gate 52 provided by a pair of stationary rollers or pins 54, 56 which are mounted within the body 38 in close proximity to one another and on opposite sides of the strand 22. In addition, these pins 54, 56 are situated downstream of the cavity 40 so that the strand 22 is forced to pass through the gate 52 after it exits the cavity 40 and before it reaches the surface of the mandrel 24. As the polymer-impregnated strand 22 is routed through the gate 52, the pins 54, 56 further blend the polymer melt 36 within the fiber of the strand 22 and help to shape and condition the strand 22 into a flattened condition. For purposes of adjusting the spacing of the pins 54, 56 (to accommodate the passage therebetween of strands of different thicknesses), at least one pin 56 can be adjusted in position relative to the body 38 to accommodate a shift of the pin 56 toward or away from the other pin 56.

For delivering the extruded polymer melt 36 to the cavity 40 of the wetting assembly 35 and with reference again to FIG. 1, the system 20 includes an extrusion apparatus 58 comprising an extruder portion 60 into which polymer stock 62, e.g. in pellet form, is conducted and an extrusion die 64 through which the polymer, in a softened or melted condition, is pushed by the extruder portion 60. The construction and operation of the extrusion apparatus 58 are well known in the art so that a detailed description thereof is not believed to be necessary. Suffice it to say that the extruder portion 60 has an inlet end 66 through which polymer stock 62 is gravitationally introduced from an elevated, funnel-shaped receptacle 67 and a discharge end 68 upon which the extrusion die 64 is mounted. An auger-like device (not shown) is rotatably mounted within the interior of the extruder portion 60 for pushing the polymer stock 62 toward and through the discharge end 68, and electric heater elements 70 are mounted adjacent the discharge end 68 for raising the temperature of the polymer stock 62 situated adjacent the end 68 to a softened condition to facilitate its introduction through the extrusion die 64 by action of the extruder portion 60.

For controlling the temperature of the polymer melt 36 upon its introduction into the cavity 40, there is provided an electrically-powered cartridge heater (not shown) mounted within the body 38 of the wetting assembly 35 so as to be in heat exchange relationship with the polymer positioned within the cavity 40. Thermocouples (not shown) are also mounted within the body 38 and are connected in controlling relationship with this cartridge heater for maintaining the temperature of the body 38 within a preselected temperature range so that the polymer 36 is maintained in a melted condition and to impart desirable flow characteristics, e.g. viscosity, to the polymer. It follows that the processing temperature profile of the polymer 36 as it moves through the system 20 can be staged at the extruder portion 60, the wetting assembly 38 and the mandrel 24, thus accommodating a preselection, or control, of viscosity and flow control characteristics related to the polymer as the polymer is moved through the various sections of the system 20 and prevent the cooling, or curing, of the polymer until it reaches a desired position about the mandrel 24.

Figure 3:
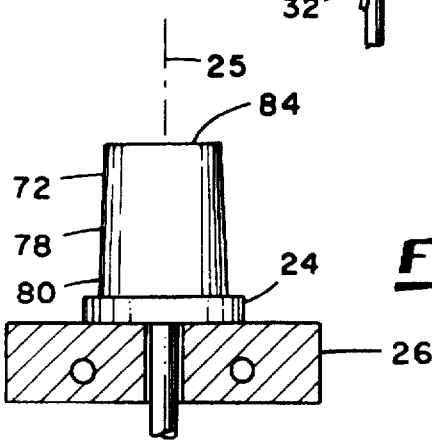
FIG. 3 is a cross-sectional view of a portion of the FIG. 2 fragment taken about along line 3—3 of FIG. 2 but shown with no polymer-impregnated fiber positioned about the mandrel depicted therein.

With reference again to FIGS. 2-4, the mandrel 24 of the depicted system 20 includes an elongated core 72 constructed, for example, of brass and rotatably supported over the heating block 26, introduced earlier, for rotation relative thereto about the vertically-arranged axis 25. The rotation axis 25 generally corresponds with the longitudinal axis of the depicted mandrel core 72. The rotation of the mandrel 24 is effected by an electric motor 74 (FIG. 1) supported adjacent the heating block 26 and a drive chain 76 which drivingly connects the shaft of the motor 74 to the mandrel 24. As best shown in FIG. 3, the core 72 of the mandrel 24 has a peripheral surface 78 having a lower section 80 which is bounded on its lower end by a shoulder 82 formed in the mandrel 24 and a free end 84 which is spaced above the lower portion 80. The diameter of the core 72 generally decreases as a path is traced upwardly along the core 58 from the shoulder 82 thereof so that the peripheral surface 78 converges toward the rotation axis 25 as a path is traced upwardly therealong from the lower section 80 toward the free end 84. In the depicted system 20, this convergence of the peripheral surface 78 provides a slope of about one degree from the vertical, and as will be apparent herein, this sloped surface 78 helps to facilitate a vertical shift of the windings of the polymer-impregnated strand 22 along the length of the mandrel 24 during a product-forming operation.

As mentioned earlier, the fiber strand 22 is fed to the mandrel 24 for winding thereabout by way of the wetting assembly 35, and the strand 22 is fed to the wetting assembly 35 from a source 86 (FIG. 1) of glass fiber wound in a creel 88 (whose temperature is at ambient conditions). Therefore, as the fiber strand 22 is drawn into the wetting assembly 35 by the rotating mandrel 24, the strand 22 is continuously unwound from the creel 88. For purposes of removing a twist from the strand 22 (which is normally incorporated within the strand 22 when it is wound into the creel 88 at manufacture), the system 20 includes a rotating platform 90 upon which the creel 88 is supported and an associated means (such as a motor 92) for rotating the platform 90 in conjunction with the withdrawal of the strand 22 from the creel 88. To this end, the platform 90 is rotated at a rate of about one revolution per length of strand being removed from the creel 88 wherein the strand length is about equal to the circumference of the creel 88. Although the fiber strand 22 of the depicted example is comprised entirely of glass, the fiber strand 22 may contain carbon fibers.

Figure 4:
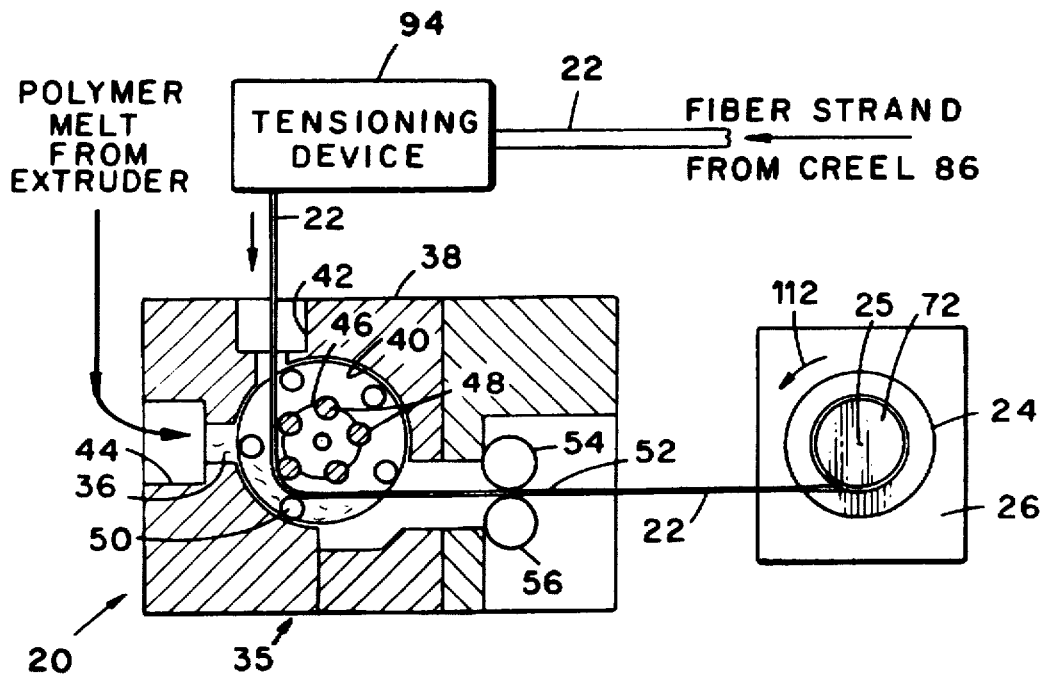
FIG. 4 is a cross-sectional view of the FIG. 2 fragment taken about along line 4—4 of FIG. 2.
Figure 5:
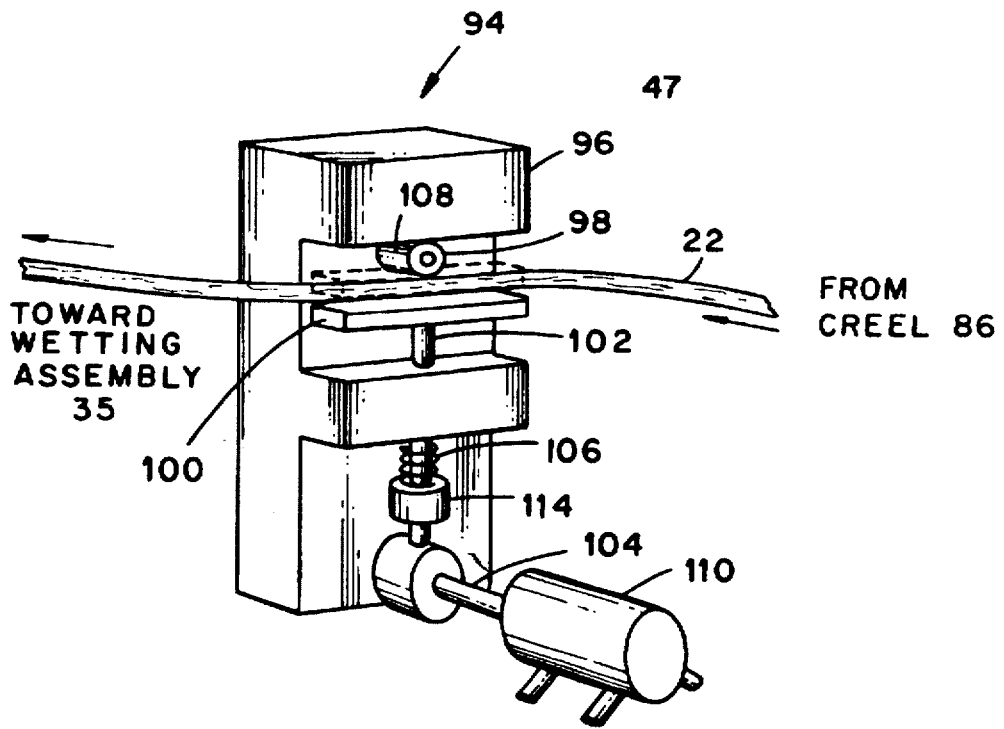
FIG. 5 is a perspective view of another fragment of the FIG. 1 system.

It is a feature of the system 20 that it includes means, generally indicated 94 in FIGS. 4 and 5, for intermittently applying a tension upon the strand 22 as it is drawn through the wetting assembly 35 by the rotating mandrel 24. In the depicted system 20, the tensioning means 94 includes a body 96 provided with a notch 98 in one side thereof, and a cam-actuated plunger 100 mounted for movement toward and away from the upper surface of the notch 98. In this connection, the plunger 100 includes a shaft 102 which is slidably mounted within the body 96 for vertical movement relative thereto, and the lower end of the shaft 102 is slidably supported upon the surface of a rotating cam 104. A spring 106 is positioned about the shaft 102 for biasing the lower end of the shaft 102 against the surface of the cam 104, and an elastomeric member 108 is secured to the upper surface of the notch 98. The fiber strand 22 is routed between the surface of the plunger 100 and the elastomeric member 108 so that as the strand 22 is pulled by the rotating mandrel 24, the mandrel 24 attempts to advance the strand 22 through the notch 98 by a corresponding amount. However, the rotation of the cam 104 by way of, for example, an electric motor 110 raises and lowers the plunger 100 from a lowered (FIG. 5 solid-line) position at which the plunger 100 is appreciably spaced from the elastomeric member 108 and a raised (FIG. 5 phantom-line) position at which the strand 22 is pinched between the surfaces of the plunger 100 and the elastomeric member 108 without damaging the fibers of the strand 22.

When pinched in the aforedescribed manner, the frictional engagement between the strand 22 and the opposing surfaces of the plunger 22 and member 108 generates a drag upon the strand 22 which retards the advancement of the strand 22 through the notch 98, and this retardation of advancement tensions the strand 22 between the mandrel 24 and the tensioning means 94. Consequently, as the strand 22 is pulled by the rotating mandrel 24, the strand 22 is intermittently tensioned (in equally-spaced intervals) by the tensioning assembly 80. As will be apparent herein, this intermittent tensioning of the strand 22 helps to complete the wetting, or blending, of the fiber strand 22 with the polymer melt 36 as it is moved through the wetting assembly 35 and as the polymer-impregnated strand 22 is wrapped about the mandrel 24. As will be described in greater detail herein, the degree of tensioning of the strand 22 at the tensioning means 94 is largely responsible for the rate of growth in length of the arrangement of windings about the mandrel 24. To accommodate an adjustment in the tension exerted upon the strand 22, the depicted tensioning means 94 includes an adjustment member 114 for lengthening the plunger shaft 102 which, in turn, alters the strength of the pinch between the elastomeric member 108 and the plunger 100 when the plunger 100 is in its uppermost position.

At the outset of a product-forming operation, the polymer melt 36 is introduced into the cavity 40 of the wetting assembly 35, and the strand 22 is routed from the creel 88 in sequence through the tensioning means 94 and then through the cavity 40 of the wetting assembly 35 so that the strand 22 exits the wetting assembly 35 by way of the gate 52 with its fibers impregnated with the polymer of the melt.

Due in part to the removal of the twist of the strand 22 by way of the rotating platform 90, the treatment of the strand 22 as it is moved between the pins 48 of the scrubber member 46 and the stationary pins 50, the intermittent tensioning of the strand 22 by the tensioning means 94, and the directing of the polymer-impregnated strand 22 through the gate 52, the fibers of the strand 22 are well-blended with the polymer melt 36 and the polymer-impregnated strand 22 is shaped to a flattened condition upon exiting the wetting assembly 35 through the gate 52. The polymer-impregnated strand 22 is then secured about the rotating mandrel 24 so that the rotation of the mandrel 24 in the direction of the arrow 112 of FIG. 4 pulls the strand 22 from the creel 88 and wraps the strand 22 about the mandrel 24. As best shown in FIG. 4, the polymer-impregnated strand 22 is initially wrapped about the lower section 80 (FIG. 3) of the surface 78 of the mandrel 24 as the strand 22 is pulled thereto.

If no tension were applied to the strand 22 as the mandrel 24 is rotated, the strand 22 would tend to wrap entirely about the lower section of the mandrel surface 80 (and eventually about itself) with little or no order to the build-up of windings about the mandrel 24. However, by intermittently tensioning the polymer-impregnated strand 22 in the aforedescribed manner, the strand 22 is intermittently tightened about the mandrel 24 in a manner which effects a sliding of the collected windings upwardly along the sloped surface 78 of the mandrel 24 and thus upwardly along the length of the mandrel 24 toward the free end 84 thereof. In other words, as the strand 22 is tightened by the tensioning assembly 94 about the mandrel 24, the lowermost winding of the strand 22 tends to slide upwardly along the sloped surface 78 as the tensioned condition of the lowermost winding urges the winding to seek a condition of reduced diameter. In this case, of course, the condition of reduced diameter corresponds with its condition when moved toward the free end 84 of the mandrel 24. It will be understood that as the lowermost winding of the polymer-impregnated strand is urged upwardly along the sloped surface 78, the windings disposed above the lowermost winding are urged upwardly by the lowermost winding so that the windings of the resulting product 18 (FIG. 6) are arranged in a closely wrapped arrangement and so that the surface of the mandrel 24 accommodates the feed thereto of subsequent segments of the polymer-impregnated strand 22. As will be apparent herein, this upward sliding of the polymer-impregnated strand 22 along the surface of the mandrel also effects a desirable shifting of many of the fibers of the strand 22 to an off-axis orientation.

It will also be understood that as the windings are accumulated along the length of the mandrel 24, the adjacent windings in the arrangement of windings overlap and contact one another. Such a consequence is advantageous in that during the winding of the polymer-impregnated strand about the mandrel 24, the amount of polymer melt contained within one winding engages the amount of polymer melt contained within its adjacent winding so that after the polymer melt within the accumulation of windings is permitted to cool (e.g. cure) to a hardened condition, the adjacent windings are bonded to one another by way of the polymer contained therein.

As the windings of the strand 22 are accumulated about the mandrel 24 and shifted upwardly therealong toward the free end 84 thereof, the polymer contained within the windings is permitted to cool. It is preferred that the rate of cool of the polymer is such that by the time that each winding is shifted off of the free end 84 of the mandrel 24, the polymer of the winding is cooled to a partially-hardened condition. If the polymer cools too quickly (i.e. solidifies too much before it reaches the free end 84), it begins to adhere appreciably to the peripheral surface 78 and retard the advancement of the windings upwardly along the mandrel length, and if it cools too slowly (i.e. is still in a fluid state when it reaches the free end 84), the polymer may separate from the strand 22 and the quality of the resulting product is likely to be adversely affected. In practice, the polymer is preferably cooled at a rate so that polymer solidification begins as the polymer is moved along the upper one-third of the length of the mandrel 24 and so that by the time that the windings reach the free end 84, the structure achieves a relatively rigid and self-supporting condition.

To coordinate the rate at which the polymer is cooled, and thereby hardened, as it moves toward and off of the free end 84 of the mandrel 24, the tension exerted upon the strand 22 can be adjusted at the tensioning means 94 and the temperature of the polymer 36 at the site of the mandrel 24 can be appropriately controlled by way of the heating block 26. Other modifications of the system 20 can be had, such as a changing of the mandrel 24 with another mandrel to thereby alter the mandrel length or its surface roughness or the utilization of supplemental (e.g. fan) cooling of the polymer disposed along the length of the mandrel 24, to affect the condition of the polymer of the accumulated windings as the windings are moved off of the free end 84 of the mandrel 24.

It will be understood that as the windings are collected upon the mandrel 24 and advanced upwardly therealong, the collected windings slide off and extend above the upper end of the mandrel core 72. Thus, the length of the product ultimately formed with the system 20 is not limited by the length of the mandrel 24, and in fact, the product can be made continuously and to any desired length. Since the product can be made continuously and has exceptional hoop strength, the product is expected to find application as a protective (e.g. underground) conduit for use with optic fibers and telecommunications lines, and in other applications requiring a conduit having good crush strength and long term durability.

Another advantage provided by the intermittent tensioning of the strand 22 as it is pulled by and wound about the mandrel 24 relates to the volume fraction of fiber to that of polymer in the resultant product. In other words, by altering the strength of the intermittent tension exerted upon the polymer-impregnated strand 22, the relative volume fractions of polymer and fiber within the resultant product is altered. As a general rule, the greater the strength of the exerted tension, the greater the amount of polymer which is squeezed out of the accumulated windings at the mandrel 24, and the greater the volume fraction of fiber in the resulting product. Thus, by controlling the strength of the tension exerted upon the strand 22 during a product-forming operation, the relative volume fractions of polymer and fiber in the resultant product can be controlled.

Figure 7:
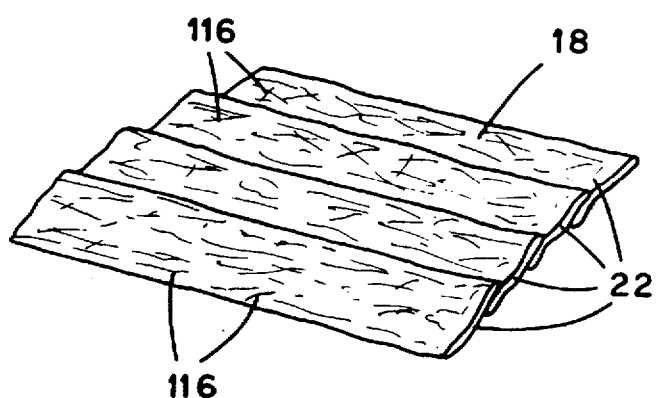
FIG. 7 is a perspective view of a fragment of the interior of the FIG. 6 product shown cut open and placed in a spread condition.

As mentioned above, the intermittent tensioning of the polymer-impregnated strand 22 effects an upward shift of the accumulated windings along the length of the mandrel 24 as well as an off-axis shift of many of the fibers of the strand 22. This off-axis shift of the fibers of the strand 22 as the strand 22 is advanced along the mandrel length and the aforedescribed conditioning of the polymer-impregnated strand 22 to a flattened condition as it exits the gate 52 helps to position the fibers of the strand is somewhat of a splayed condition, as illustrated in FIG. 7, by the time that the fibers of the strand 22 are moved off of the free end 84 of the mandrel 24 so that many of the fibers (such as fibers 116 of FIG. 7) of the strand 22 are oriented somewhat axially (rather than purely annularly) within the wraps of the accumulated windings. Therefore, when these off-axis strands are fixed in place in the off-axis condition by the polymer (when hardened), the strands contribute to the compression strength of the resulting product when loads are applied to the side thereof and are advantageous in this respect.

The polymer used in the aforementioned method can be polypropylene or Nylon 6 or any other polymer which provides a stable thermoplastic melt. One polymer found to be well-suited for use with the method of the invention is a polypropylene resin (in pellet form) from Exxon Chemical Company of Baytown, Tex. under the designation PP 3445. When using the aforedescribed polypropylene from Exxon (which has been found to solidify between about 150° and 155° C.), the temperature of the upper surface of the heating block 26 is maintained at about 210° C. so that the temperature of the polymer contained within lowermost winding about the mandrel 24 is about 173° C.

On the other hand, the strand 22 can be a continuous strand of fiberglass. An example of a fiber strand suitable for use with the method of the invention is available from PPG Industries, Inc. of Lexington, N.C., under the product description no. 3224 225 and product code 23013-75180. As mentioned earlier, the composition of the fiberglass may include carbon fibers, as well as glass fibers, and the relative composition of carbon fibers to glass fibers within the fiberglass may fall within any suitable range. By using a fiber strand having a desired (predetermined) carbon fiber content, the strength characteristics of the resultant product can be preselected.

In an application in which is desired that the continuity of the resulting product be capable of being checked during use, for example, as an underground conduit, a continuous copper wire may be introduced to the mandrel 24 as the polymer-impregnated strand 24 is being wound thereabout so that the copper wire is embedded, upon hardening of the polymer of the windings, along the length of the resulting product.

Furthermore, a mandrel 24 having a length of about 1.5 inches (as measured from the shoulder 82 to the free end 84) and a surface 86 which has been polished to a high surface finish with a 500 grit polish compound has been found to be well-suited for use with the system 20. The mean diameter of the mandrel core 72 may fall in the range of about 0.5 inches to about 6.0 inches, depending upon the desired diameter of the resulting product. By way of example, products like that of product 18 of FIG. 5 have been constructed in accordance with the aforedescribed method having wall thicknesses of 0.05 to 0.12 inches and diameters of about 0.75 inches, and a polymer-impregnated strand 22 comprising the aforementioned Exxon polypropylene and the aforementioned PPG fiber strand 22 is conditioned by the system 20 to a width ranging from between about 0.25 inches to about 0.75 inches.

It will be understood that numerous modifications and substitutions can be had to the aforedescribed embodiments without departing from the spirit of the invention. For example, the aforedescribed method can be adapted to introduce within the windings of the polymer-impregnated strand 22, as it is being wrapped about the mandrel 24, additional strands (or segments thereof) of fiber along the length of the mandrel. The introduction of such strands within the windings will result in a product having an enhanced axial strength. Accordingly, the aforedescribed embodiments are intended for the purpose of illustration and not as limitation.

We claim:

1. A method for forming a structure of polymer-impregnated fiber comprising the steps of:

providing a rotatable mandrel having a peripheral surface about which the desired structure is to be formed and a length which terminates at a free end and wherein the mandrel surface includes a preselected section along the mandrel length which is spaced from the free end;

rotating the mandrel about a rotational axis;

providing a continuous fiber strand which has been impregnated with a heated polymer melt;

feeding the continuous strand of polymer-impregnated fiber to the preselected section of the surface of the rotating mandrel while the polymer of the polymer-impregnated strand is in a melted condition so that the mandrel pulls the strand toward and winds the strand about the mandrel surface in an arrangement of windings;

advancing the arrangement of windings along the length of the mandrel toward and off of the free end as the polymer-impregnated fiber strand is fed to the preselected section of the mandrel surface;

permitting the polymer of the polymer-impregnated strand to cool as the arrangement of windings is advanced toward and off of the free end so that upon advancement of the windings of the arrangement off of the free end, the polymer contained within the strands of the windings is at least partially-hardened;

wherein the step of feeding is followed by a step of exerting a tension upon the polymer-impregnated strand as the polymer-impregnated strand is wound about the mandrel surface; and wherein the surface of the mandrel converges toward the axis of mandrel rotation as a path is traced along the length of the mandrel from the preselected section of the mandrel surface toward the free end thereof, and the tension exerted upon the polymer-impregnated strand cooperates with the converging surface of the mandrel to effect the advancement of the arrangement of windings along the length of the mandrel toward and off of the free end of the mandrel as the polymer-impregnated fiber strand is fed to the preselected section of the mandrel surface.

2. The method as defined in claim 1 wherein the step of advancing is coordinated with the rate of cooling of the polymer of the polymer-impregnated strands about the mandrel surface so that the windings are moved off of the free end of the mandrel before the polymer of the strands of the windings begins to appreciably stick to the mandrel surface.

3. The method as defined in claim 1 wherein the step of feeding is preceded by a step of conditioning the polymer-impregnated fiber strand to a relatively flat condition so that upon reaching the preselected section of the mandrel surface, the fibers of the polymer-impregnated strand are in a relatively flattened condition.

4. The method as defined in claim 1 wherein the step of feeding is preceded by the steps of:

providing an amount of heated polymer melt; and directing a continuous strand of fiber through the amount of polymer melt so that the fiber strand is impregnated with the polymer and the resulting polymer-impregnated fiber strand is the continuous polymer-impregnated strand which is fed to the rotating mandrel surface during the feeding step.

5. The method as defined in claim 4 wherein the step of providing an amount of heated polymer melt is preceded by a step of extruding the polymer so that the polymer melt through which the fiber strand is directed has been extruded.

6. The method as defined in claim 1 wherein the step of providing a continuous fiber strand is preceded by the steps of:

providing means defining a cavity through which a continuous strand of fiber can be routed;

introducing a heated polymer melt into the cavity;

routing a continuous strand of fiber through the cavity so the fiber is exposed to the heated polymer melt introduced therein; and scrubbing the surface of the continuous strand of fiber as the fiber is moved though the cavity to blend the polymer melt within the fibers of the strand and thereby impregnate the continuous strand of fiber with the polymer melt.

7. The method as defined in claim 6 wherein the step of scrubbing is preceded by a step of rotatably mounting a scrubber member within the cavity for rotation about an axis of rotation wherein the scrubber member includes a series of pins arranged in parallel relationship about the periphery of the scrubber member, and the step of scrubbing the surface of the strand of fiber is effected by moving the strand of fiber along the periphery of the scrubber member and rotating the scrubber member about its axis of rotation so that the pins of the scrubber member rub against the surface of the strand of fiber in a scrubbing action.

8. A method for forming a structure of polymer-impregnated fiber comprising the steps of:

providing a rotatable mandrel having a peripheral surface about which the desired structure is to be formed and a length which terminates at a free end and wherein the mandrel surface includes a preselected portion along the mandrel length which is spaced from the free end;

rotating the mandrel about a rotational axis;

providing a continuous fiber strand which has been impregnated with a heated polymer melt;

feeding the continuous strand of polymer-impregnated fiber to the preselected section of the surface of the rotating mandrel while the polymer of the polymer-impregnated strand is in a melted condition so that mandrel pulls the strand toward and winds the strand about the mandrel surface in an arrangement of windings;

advancing the arrangement of windings along the length of the mandrel toward and off of the free end as the polymer-impregnated fiber strand is fed to the preselected section of the mandrel surface;

permitting the polymer of the polymer-impregnated strand to cool as the arrangement of windings is advanced toward and off of the free end so that upon advancement of the windings of the arrangement off of the free end, the polymer contained within the strands of the windings is at least partially-hardened;

wherein the step of feeding is followed by a step of exerting a tension upon the polymer-impregnated strand as the polymer-impregnated strand is wound about the mandrel surface; and wherein the tension exerted upon the polymer-impregnated strand is intermittently-applied to the strand.

9. A method for forming a structure of polymer-impregnated fiber comprising the steps of:

providing a rotatable and elongated mandrel having a length, a peripheral surface about which the desired structure is to be formed and a free end to which the peripheral surface extends and wherein the mandrel surface includes a preselected section along the mandrel length which is spaced from the free end;

rotating the mandrel about a rotational axis which generally corresponds with the longitudinal axis of the mandrel;

providing a continuous fiber strand which has been impregnated with a heated polymer melt;

feeding the continuous strand of polymer-impregnated fiber to the preselected section of the surface of the rotating mandrel while the polymer of the polymer-impregnated strand is in a melted condition so that the mandrel pulls the strand toward and winds the strand about the mandrel surface in an arrangement of windings and so that the arrangement of windings increases in size as the polymer-impregnated strand continues to be fed to the preselected section of the mandrel surface;

shifting the arrangement of windings along the length of the mandrel toward and off of the free end as the fiber-impregnated strand is fed to the preselected section of the mandrel surface;

permitting the polymer of the polymer-impregnated strand to cool as the arrangement of windings is shifted toward and off of the free end so that upon advancement of the windings of the arrangement off of the free end, the polymer of the strands of the windings is in a partially-hardened condition;

wherein the step of feeding is followed by a step of exerting a tension upon the polymer-impregnated strand as the polymer-impregnated strand is wound about the mandrel surface; and wherein the surface of the mandrel converges toward the axis of mandrel rotation as a path is traced along the mandrel length from the preselected section of the mandrel surface toward the free end thereof, and the tension exerted upon the polymer-impregnated strand during the exerting step cooperates with the converging surface of the mandrel to effect the shift of the arrangement of windings along the length of the mandrel toward and off of the free end of the mandrel as the Polymer-impregnated fiber strand is fed to the preselected section of the mandrel surface.

10. The method as defined in claim 9 wherein the step of shifting is coordinated with the rate of cooling of the polymer of the polymer-impregnated strands about the mandrel surface so that the windings are moved off of the free end of the mandrel before the polymer of the strands of the windings begins to appreciably adhere to the mandrel surface.

11. The method as defined in claim 9 wherein the step of feeding is preceded by a step of conditioning the polymer-impregnated fiber strand to a relatively flat condition so that upon reaching the preselected section of the mandrel surface, the fibers of the polymer-impregnated fiber strand are splayed to a relatively expansive condition.

12. The method as defined in claim 9 wherein the step of feeding is preceded by the steps of:

providing an amount of heated polymer melt; and directing a continuous strand of fiber through the amount of polymer melt so that the fiber strand is impregnated with the polymer and the resulting polymer-impregnated fiber strand is the continuous polymer-impregnated strand which is fed to the rotating mandrel surface during the feeding step.

13. The method as defined in claim 12 wherein the step of providing an amount of heated polymer melt is preceded by a step of extruding the polymer so that the polymer melt through which the fiber strand is directed has been extruded.

14. A method for forming a structure of polymer-impregnated fiber comprising the steps of:

providing a rotatable and elongated mandrel having a length, a peripheral surface about which the desired structure is to be formed and a free end to which the peripheral surface extends and wherein the mandrel surface includes a preselected section along the mandrel length which is spaced from the free end;

rotating the mandrel about a rotational axis which generally corresponds with the longitudinal axis of the mandrel;

providing a continuous fiber strand which has been impregnated with a heated polymer melt;

feeding the continuous strand of polymer-impregnated fiber to the preselected section of the surface of the rotating mandrel while the polymer of the polymer-impregnated strand is in a melted condition so that the mandrel pulls the strand toward and winds the strand about the mandrel surface in an arrangement of windings so that the arrangement of windings increases in size as the polymer-impregnated strand continues to be fed to the preselected section of the mandrel surface;

shifting the arrangement of windings along the length of the mandrel toward and off of the free end as the polymer-impregnated fiber strand is fed to the preselected section of the mandrel surface;

permitting the polymer of the polymer-impregnated strand to cool as the arrangement of windings is shifted toward and off of the free end so that upon advancement of the windings of the arrangement off of the free end, the polymer of the strands of the windings is in a partially-hardened condition; and wherein the step of feeding is followed by a step of exerting a tension upon the polymer-impregnated strand as the polymer-impregnated strand is wound about the mandrel surface: and wherein the tension exerted upon the polymer-impregnated strand is intermittently-applied to the strand in substantially equally-spaced intervals.

15. A method for forming a tubular structure with a continuous strand of fiber comprising the steps of:

providing a rotatable mandrel having a surface about which the desired structure is to be formed and a length;

rotating the mandrel;

impregnating a continuous strand of fiber with a heated polymer melt;

feeding the polymer-impregnated fiber strand to the surface of the mandrel while the polymer of the polymer-impregnated strand is in a melted condition so that the polymer-impregnated strand is wound about the mandrel in an arrangement of windings;

shifting the arrangement of windings along the length of the mandrel as the polymer-impregnated fiber strand is wound thereabout so that the arrangement of windings is forcibly slid axially along the surface of the mandrel; and permitting the arrangement of windings to cool to a hardened condition;

wherein the step of rotating the mandrel effects the rotation thereof about an axis, the mandrel has a surface portion which is sloped with respect to the rotation axis, and the step of feeding is followed by a step of applying a tension upon the polymer-impregnated fiber strand in substantially equally-spaced intervals as it is wound about the mandrel so that the sloped surface portion of the mandrel and the tension applied upon the fiber strand cooperate to shift the arrangement of windings along the length of the mandrel as aforesaid.

* * * * *